United States Patent [19]
Martin

[11] Patent Number: 5,319,622
[45] Date of Patent: Jun. 7, 1994

[54] CONTROL AND INFORMATION DISK FOR DISK RECORDING SYSTEM

[75] Inventor: Michael B. Martin, San Jose, Calif.

[73] Assignee: AST Research, Inc., Irvine, Calif.

[21] Appl. No.: 944,812

[22] Filed: Sep. 14, 1992

Related U.S. Application Data

[63] Continuation of Ser. No. 478,105, Feb. 9, 1990, abandoned.

[51] Int. Cl.⁵ .............................................. G11B 7/00
[52] U.S. Cl. ............................. 369/44.14; 369/44.27; 369/49
[58] Field of Search ................. 369/43, 44.14, 44.25, 369/13, 14, 34, 36, 37, 47, 100, 111, 44.27, 48, 49; 360/77.05, 77.11

[56] References Cited

U.S. PATENT DOCUMENTS

| | | | |
|---|---|---|---|
| 3,361,873 | 1/1968 | Johnson et al. | 369/111 |
| 3,391,255 | 7/1968 | Gregg | 369/111 |
| 3,534,344 | 10/1970 | Santana | 360/77.05 |
| 3,716,845 | 2/1973 | Chaffin, III | 369/111 |
| 3,774,172 | 11/1973 | Silverman | 369/34 |
| 4,068,267 | 1/1978 | Inouye | 360/77.05 |
| 4,136,365 | 1/1979 | Chick et al. | 360/77.11 |
| 4,381,556 | 4/1983 | Bourdon et al. | 369/44.14 |
| 4,432,083 | 2/1984 | Hsieh et al. | |
| 4,644,515 | 2/1987 | Allebest et al. | 369/34 |
| 4,719,615 | 1/1988 | Feyrer et al. | |
| 4,890,174 | 12/1989 | Chalmers et al. | 360/77.05 |
| 5,012,363 | 4/1991 | Ming et al. | 360/77.05 |

Primary Examiner—Donald E. McElheny, Jr.

[57] ABSTRACT

A system and method for recording on optical and electromagnetic disk media utilize a control disk for formatting and providing speed control of the recorded information. Optionally, the control disk may provide operating, diagnostic, and a wide variety of other information to the recording system or user. A recording disk and the control disk are rotated synchronously with each other while the control disk is scanned by a read head which derives formatting, speed control, and other information. A write head on the recording disk is then manipulated in a pattern determined by the formatting and speed control information. Typically, the read head and write head are mechanically coupled so that the write head is positioned as the read head follows a tracking information on a read surface of the control disk to write a tracking pattern to a write surface of the recording disk in a recordable region between a start-of-disk pattern and an end-of-disk pattern.

22 Claims, 2 Drawing Sheets

CONTROL AND INFORMATION DISK FOR DISK RECORDING SYSTEM

This is a continuation of application Ser. No. 07/478,105 filed Feb. 9, 1990, now abandoned.

BACKGROUND OF THE INVENTION

1. Field of the Invention

The present invention relates generally to systems and methods for recording information on optical and electromagnetic recording disks. In particular, the invention relates to the use of a control disk for providing formatting and speed control information during recording on a blank recordable disk. Optionally, the control disk may also provide operating, diagnostic, and a wide variety of other information for the system or user.

2. Description of the Background Art

Optical data storage media in the form of compact disks are well known as an alternative to long playing records and magnetic tape cassettes. The disks with which consumers are familiar are optical read-only disks and the common disk player is designed specifically for this type of disk. These disks have a reflective surface containing pits which represent data in binary form. The pits are arranged in a spiral pattern with a 1.6 $\mu$m pitch and define both informational data, e.g., music or text, and control data which provide instructions to the player on how to play the disk. Specific control information includes start-of-disk codes, end-of-disk codes, tracking information, rotational speed information, and the like. A detailed description of these pits and how they function is provided by Watkinson, *The Art of Digital Audio*, Focal Press, Chapter 13.

Compact disks are currently produced by a pressing process similar to the process used to produce conventional long playing records. The process, referred to herein as the "mastering" process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photosensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now known as the glass master, then undergoes nickel electrocasting, a process which is similar to that used in making analog phono records. A series of metal replications follow, resulting in a disk called a stamper. The stamper is equivalent to a photographic negative in the sense that it is a reverse of the final compact disk; that is, there are now bumps were there should be pits. This stamper is then used to make a pressing on a transparent polymer such as polyvinyl chloride, poly(ethyl-methacrylate) and polycarbonate. The stamped surface is then plated with a reflective film such as aluminum or other metal and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players. U.S. Pat. No. 4,432,083 describes a system for reading and tracking information on optical disks.

Media on which data can be recorded directly on and read directly from have a different configuration and operate under a somewhat different principle. One example is described in U.S. Pat. No. 4,719,615 (Feyrer et. al.), the disclosure of which is incorporated herein by reference. Other examples are described in copending application serial numbers 152,690; 294,723; 357,377; 357,504; 357,506; 414,041; and 414,044, the disclosures of Which are incorporated herein by reference.

The medium disclosed in Feyrer et. al. includes a lower expansion layer of a rubbery material which expands when heated. The expansion layer is coupled to an upper retention layer which is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump. Reading or playback of the data is then achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer and not the expansion layer. This beam heats the retention layer alone to a rubbery state where its viscoelastic forces and those of the expansion layer return it to its original flat configuration. The write, read and erase beams all enter the medium on the retention layer side, passing through retention layer before reaching the expansion layer.

In recording data on blank recordable disks, it is necessary to both rotate the disk and translate the recording laser beam across the disk in a coordinated fashion in order to impart data on the disk in a readable format. Usually, the data will be recorded in a spiral pattern on the disk and it is necessary to provide tracking pattern and rotational speed control information to the recorder in order to properly coordinate the position of the laser beam and the rotational position of the disk. In addition, information must be provided to facilitate playback of the disk, including start-of-disk codes, end-of-disk codes, rotational speed codes, and the like. When the recorded disks are intended to be played back on conventional disk players, it is necessary that all encoded tracking speed, and other control information be compatible with the particular standardized system.

One approach for providing tracking, speed, and other control information on recordable disk media has been to incorporate the information on the blank during the manufacturing process. For example, digital data comprising the start-of-disk codes, end-of-disk codes, and rotational speed information can be pressed into the "blank" disk in a manner similar to conventional disk fabrication, while a spiral track or groove can be formed into the disk to allow tracking of the recording laser during the recording process. The need to incorporate such information at the manufacturing stage, however, is problematic and significantly increases the cost complexity of fabricating the disks. Moreover, the tracking grooves must be invisible to conventional disk players, further complicating their design and manufacture.

For these reasons, it would be desirable to provide methods and systems for encoding format information on blank recordable media during the recording process. In particular, it would be desirable to impart both tracking information and digital control information, such as start-of-disk codes, end-of-disk codes, and rotational speed codes, during the recording process.

SUMMARY OF THE INVENTION

A system and method are provided for recording digital or analog information on blank recording disks in a preselected format. The system includes means, such a spindle, for rotating the recording disk synchronously with a control disk, where the control disk encodes some or all information necessary for formatting the recording disk, including tracking information, rotational speed control information, start-of-disk codes, end-of-disk codes, and the like. The system further includes a read head disposed to scan the control disk and a write head disposed to record information on the recordable disk. The position of the write head is controlled based on tracking and rotational speed control information derived from the control disk. By further transferring the start-of-disk codes, the end-of-disk codes, and other playback information from the control disk, the recordable disk may be played in conventional playback systems. Although the present invention will find greatest use with recording digital information on optical recording disks, it will be applicable as well to the recording of digital and analog information on magnetic media disks.

In a particular embodiment of the present invention, the recordable disk and control disk are oriented parallel to each other with the read surface on the control disk facing the write surface on the recordable disk. The read head and write head are mechanically coupled to one another, typically being commonly mounted on a carriage, and are able to reciprocate between the two disks (in a radial direction parallel to the surface of the disks) as the disks rotate. The read head scans control information on the control disk, and the system manipulates the read head to follow the tracking information provided. By aligning the write beam of the write head with the read beam of the read head, information may be recorded on the recordable disk in a pattern which is a mirror image of that provided by the control disk. The control information on the control disk will usually be digitally encoded, and the components which are necessary for the reading of control information and positioning of the read and write heads may be identical to those conventionally employed in optical disk players. The components for writing information on optical recordable disk may similarly be those described in the issued and pending patent applications referenced above. The components which are necessary for writing digital or analog information on magnetic disks are well described in the patent and scientific literature.

In addition to providing control information useful in recording on blank media, the control disk of the present invention may provide a wide variety of other information of interest which may be played back to the user in a conventional manner. For example, the control disk may provide instructional information on how to operate the recording and playback system, diagnostic information which may be relied on by the user (or the recording system itself) in locating and/or correcting malfunctions, and the like. In the case of audio playback systems, the data can be in the form of digital audio, while in the case of computer memory applications, the data may be in computer usable form. Conveniently, the data will be incorporated within the tracking information as the data bumps incorporating the information can serve equally well to provide the tracking information necessary for recording on the recordable disk.

DESCRIPTION OF THE SPECIFIC EMBODIMENTS

The following description is directed at a system intended to record digital information on an optical (light responsive) recording disk of the type described above. The principles of the present invention, however, apply equally well to the recording of digital and/or analog information on electromagnetic disks, such as hard disks, floppy disks, and the like. Use of the present invention will allow much greater recording densities to be achieved on electromagnetic disks than have heretofore been possible.

Figure 1:
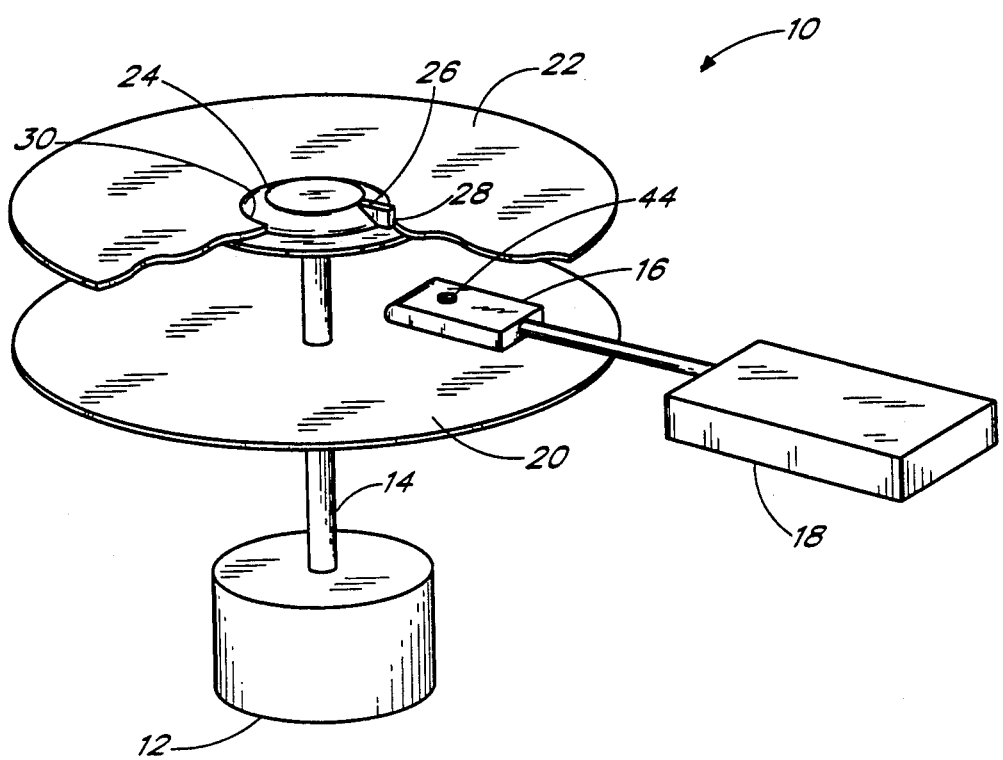
FIG. 1 is a simplified perspective drawing or a recording system constructed in accordance with the principles of the present invention with a portion of the recordable disk being broken away to show the carriage which carries the and write heads.
Figure 2:
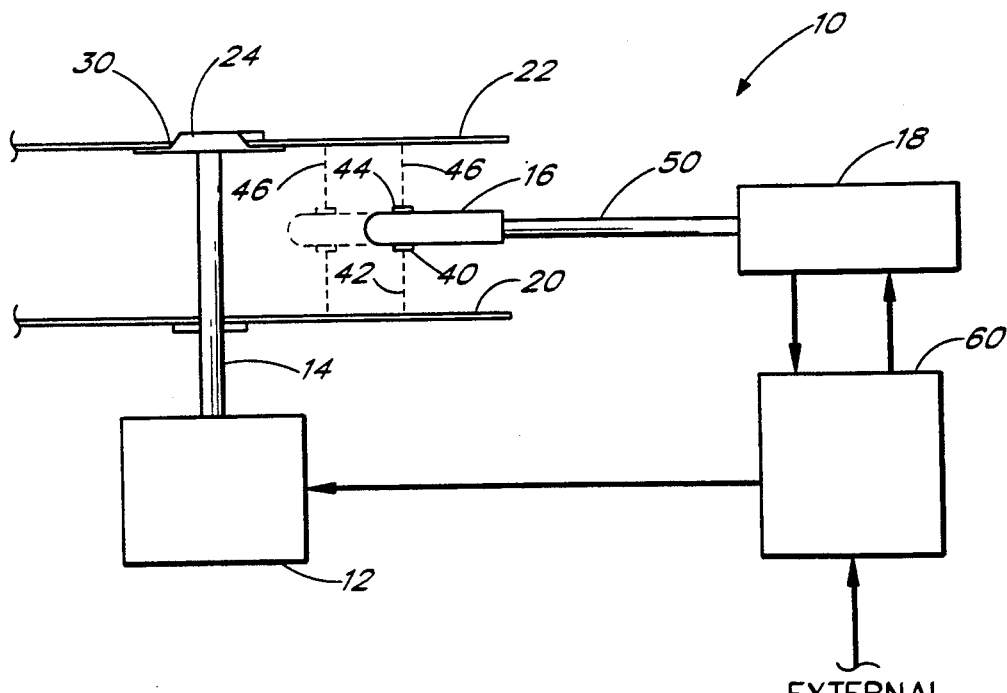
FIG. 2 is a schematic and block diagram of the system of FIG. 1 illustrating the flow of information required for recording information on the recordable disk.

Referring now to FIGS. 1 and 2, a recording system 10 constructed in accordance with the principles of the present invention will be described. The system 10 will include a drive motor 12, a spindle 14, a carriage 16, and a carriage positioner 18. The spindle 14 carries a control disk 20 and recording disk 22 and is able to synchronously rotate both disks in parallel, spaced-apart planes.

Typically, the control disk 20 will be fixedly attached to the spindle 14, although in some cases it may be desirable to provide for convenient detachment and remounting of a variety of control disks for use under different circumstances. The recording disk 22 will be detachably mounted on a pickup platen 24 which may be of a type similar to those employed in conventional optical disk systems, such as compact disk systems. Platen 24, however, will usually include means for aligning the recording disk 22 when placed on the platen. For example, a notch 26 may be provided to align with a slot 28 formed in a center hole 30 of the disk. The ability to rotationally align the recording disk 22 with the control disk 20 is desirable as it allows recording to be performed at different times with the recording disk being removed and replaced on the platen 24.

The recording disk 22 may be formed from any light-responsive recording media where discrete data points are imparted by exposing a write surface of the disk to light. Exemplary recording disks include "write once read many" (WORM) disks where information is burned into a metallic surface by a high energy laser beam, thermomagneto-optic disks where electromagnetic data is imparted on a metallic disk by exposure to a high energy light beam, phase change optical disks, thermal expansion optical disks, and the like. Of particular interest to the present invention are thermal expansion optical disks of the type described in U.S. Pat. No. 4,719,615 (Feyrer et al.), as well as copending application Ser. Nos. 152,690; 294,723; 357,377; 357,504; 357,506; 414,041; and 414,044, the disclosures of which have previously been incorporated herein by reference.

A particular advantage of the present invention is that the recording disks are not required to possess any control information to facilitate the writing of data thereon. That is, the disks can be entirely blank, greatly facilitating their manufacture. Of course, the method and system of the present invention can be utilized with recording disks which contain prerecorded information thereon. Such prerecorded information, however, will generally not be relied on to control the recording of further information on the disk.

The control disk 22 will generally be a prerecorded (non-erasable) disk including data necessary for recording information on the recording disk 22. In particular, the recording information will include start-of-disk codes, end-of-disk codes, rotational speed information, and most importantly tracking information which will be fed into the positioner 18 in order to properly position the carriage 16 in order to write information on the recording disk 22 in a desired format or pattern. Such tracking information includes both pattern information, i.e., the geometric pattern of bumps which are formed on the disk, as well as any other information necessary to allow a playback system to follow the geometric pattern.

Figure 4:
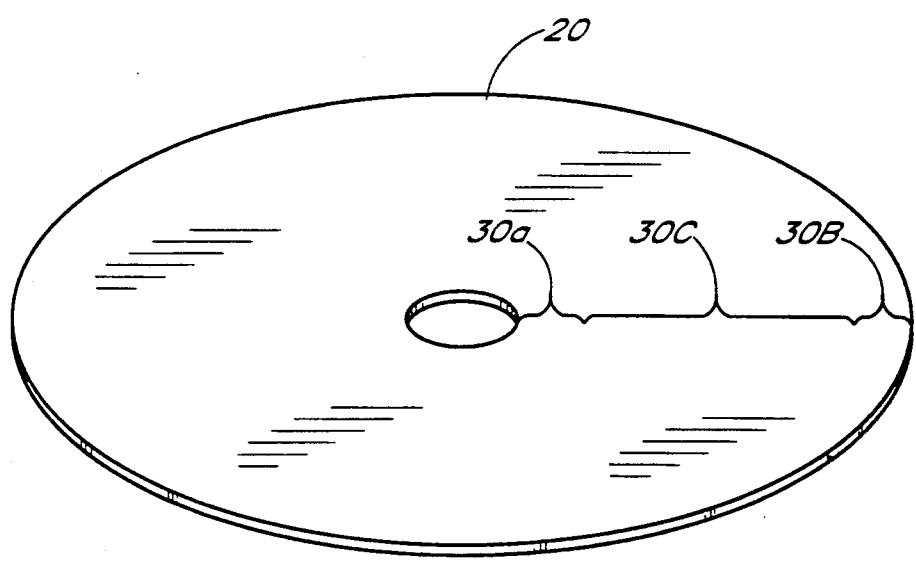
FIG. 4 is a perspective view of a recordable disk according to the present invention illustrating the various ous informational domains on the disk.

Referring to FIG. 4, the control disk 20 will generally be divided into a plurality of domains 30 each of which contain a different type of information useful in controlling the recording on the recording disk 22. For example, an inner domain 30a may contain the necessary start-of-disk codes, while an outer domain 30b may contain the necessary end-of-disk codes. The central domain 30c might then contain the tracking information as well as rotational speed information necessary for recording externally provided information on the recording disk. Usually, the start-of-disk codes and end-of-disk codes will include both information necessary for beginning and ending of the recording process as well as data to be encoded on the recording disk 22 to allow the disk to be subsequently played back on a conventional disk player. Such information will, of course, not be necessary if the disk is only to be played back on a specialized playback machine or the recording system 10 itself.

At a minimum, the tracking information located in domain 30c will provide a track or pattern, typically a series of data bumps formed on the disk in a conventional manner, which allow the read head on carriage 16 to track the disk and position the carriage 16. Alternatively, a continuous groove, spiral, or other indicia may be formed on the control disk to allow tracking of the read head 40. Additionally, the information in domain 30c will include disk rotational speed codes which both control the rotation of motor 12 and are encoded by the recorder onto the recording disk 22 so that it may be played back by a conventional player under the proper speed control.

In addition to the tracking information and rotation speed control information, the domain 30c on control disk 20 may be used to provide virtually any type of information which can be utilized internally by the recording system 10 or converted for use externally of the recording system. For example, the recording disk 20 may include diagnostic information or other operational information which can be used by the internal control system of the recording system 10. Alternatively, recording disk 20 may include instructional information which can be played by the recording system 10 and displayed to the user, either by audio conversion or alpha numeric displays. Such informational data may be incorporated on the recording disk 22 in a conventional manner for optical disks, such as compact disks. The same data bumps which provide the tracking information can provide the other information and will thus serve a dual purpose.

The carriage 16 includes both a read head 40 which directs a read laser beam 42 at the control disk 20 and a write head 44 which is capable of directing a write laser beam 46 at the recording disk 22. The read head 40 will comprise a variety of conventional components (not illustrated), specifically including a laser source, typically a laser diode, optical components for directing the laser beam from the laser source onto the recording disk and for further collecting light reflected from the laser disk and converting such light into a detectable electrical signal for subsequent processing. Conveniently, a standard optical read head capable of decoding digital information on a prerecorded optical disk, such as a prerecorded disk, may be utilized. The construction and specification of such optical read heads are well described in both the patent and technical literature. See, for example, Watkinson, *The Art of Digital Audio,* Chapter 13, the disclosure of which is incorporated herein by reference.

The construction of the write head 42 will vary depending on the nature of the recording media, and will typically include a laser light source, again typically being a laser diode, and optics for focusing the laser energy onto the recordable disk 22. Power requirement for the laser beam 46 provided by the write head 44 will vary depending on the nature of the recording media, as is well known in the art. Frequently, the write head 44 will also be able to read information which has been digitally encoded onto the recording disk 22. In this way, recording system 10 can also be used as a playback system for disks which have been recorded thereon and, optionally, prerecorded disks. The specifications and construction of systems suitable for writing on various optical recording media are well described in both the technical and patent literature. Particular systems for writing on thermally expansive optical disks are described in U.S. Pat. No. 4,719,615 (Feyrer et al.), and in copending application Ser. Nos. 152,690; 294,723; 357,377; 357,504; 357,506; 414,041; and 414,044; the disclosures of which have previously been incorporated herein by reference.

Usually, the read head 42 and write head 44 will be coaxially aligned so that the location of data being recorded on recording disk 22 will correspond precisely to the location on control disk 20 which is being tracked by read beam 42. In this way, the format of data recorded onto recording disk 22 will correspond precisely to the tracking information present on control disk 20 (except that it will be a mirror image thereof). Typically, the tracking information on control disk 20 will be arranged in the spiral having a 1.6 micron pitch, where the direction of the spiral is opposite to that found on conventional optical and laser disks. So long as the digital information is then encoded according to the standard optical disk or other format, the recorded disk can then be played on standard disk players.

The spacing between control disk 20 and recording disk 22 is not critical, typically being sufficient to allow a clearance in the range from about 0.1 to 10 mm on either side of the carriage 16, more typically being in the range from about 0.5 to 2 mm. The carriage 16 will typically have a height (i.e., a maximum direction measured in the direction normal to the plane of disks 20 and 22) sufficient to accommodate the internal optical and electronic components, typically being in the range from about 5 to 25 mm, more typically being in the range from about 10 to 20 mm.

The positioner 18 will be of a type similar to those employed in conventional compact disk and other laser disk systems, and will include an arm 50 which carries the carriage 16 at its distal end, where the arm 50 is capable of radially positioning the carriage so that the write beam 46 can be scanned across the entire surface of recording disk 22.

A controller 60 will be provided for controlling the positioner 18 to manipulate the carriage 16 in a desired manner and to control the spindle drive motor 12 to rotate the disks 20 and 22 at a desired speed. As described previously, the controller 60 will receive tracking information from control disk 20 through the read head 40 in a manner similar to that employed by conventional and compact and laser disk players. The tracking information will then be fed back to positioner 18 which acts as a servo positioner in properly aligning the carriage with the tracking information formed on disk 20. Additionally, controller 60 will specify the rotational speed of the disks 20 and 22 so that a constant linear velocity is maintained in the recording process. The use of constant linear velocity is standard in both the compact and laser disk systems and the recorded disk 22 may thus be made compatible with standard disk players. There is no reason, of course, why the recording disk 22 could not be recorded under different speed control protocols. It would then be necessary, however, to utilize special playback systems in order to reproduce the recorded information.

In addition to controlling the position of carriage 16 and the rotational speed of disks 20 and 22, the controller 60 will feed digital information to the write head 44 so that such information can be optically encoded onto recording disk 22. The digital information supplied may include both information obtained from the control disk, such as start-of-disk codes, end-of-disk codes, rotational speed codes, and the like, as well as external information which comprises the music, text, picture information, verbal information, or the like, which is desired to be recorded and stored on the recording disk 22.

Figure 3:
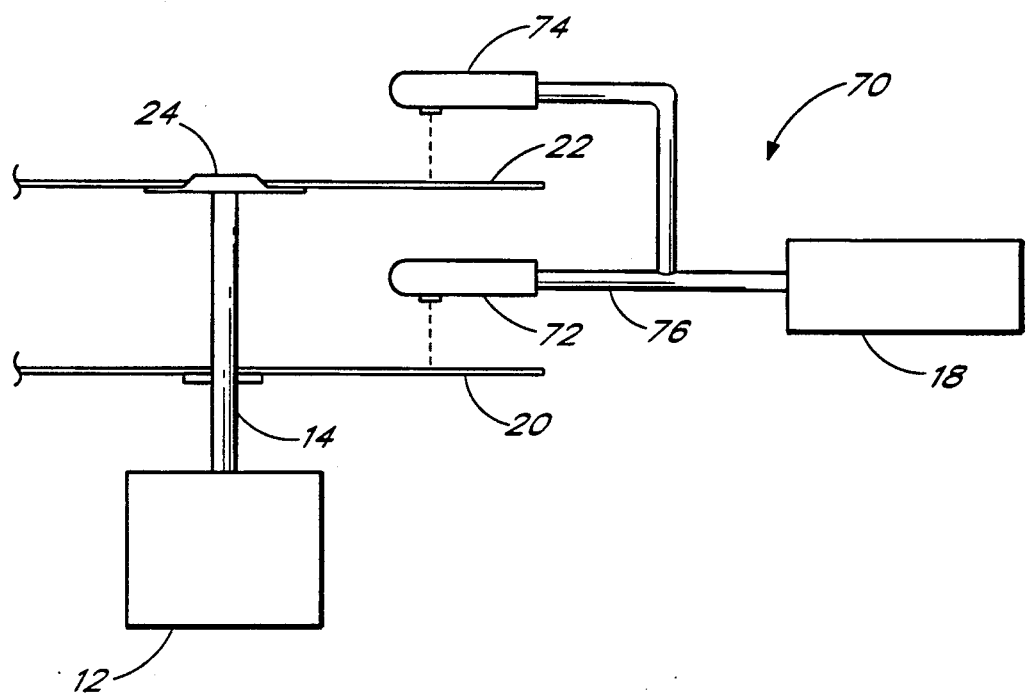
FIG. 3 is an alternate configuration of the recording system of the present invention.

Referring now to FIG. 3, an alternate embodiment 70 of the recording system of the present invention is illustrated. Recording system 70 includes a drive motor 12, a spindle 14, and a support platen 24, as previously described with reference to FIGS. 1 and 2. The spindle 14 supports a control disk 20 and a recording disk 22, and a positioner 18 is provided to reciprocate the read and write heads, also as previously described. Instead of having the read and write heads incorporated into a single carriage, however, the system 70 provides a separate read head 72 and write head 74, both of which are mechanically coupled to a single support arm 76 which extends from the positioner 18. The primary operational difference with system 70 is that the recording disk 22 may be oriented in the opposite direction to that illustrated in FIGS. 1 and 2. That is, recording disk 22 in FIG. 3 may be disposed upwardly rather than downwardly toward the control disk 20. In this way, the tracking information provided on control disk 20 may be patterned identically with the information which is recorded on disk 22, rather than as a mirror image.

A variety of other read head/write head configurations are also possible. For example, it is not essential that the read and write beams be axially aligned so long as the deviation from alignment is known and the system electronics can take it into account. Also, it is not necessary that the read head and write head be mechanically coupled and separate positioners may be provided for each, so long as the system electronics provide for precise coordination of the movement of the two heads. Other modifications in the design and construction of the present invention will occur to those skilled in the art and are intended to be encompassed within the scope of the present invention.

In operation, the system 10 is utilized by providing a control disk 20 which includes the necessary information for formatting digital information onto a recording disk 22. Usually, system 10 will employ a single control disk for all recording operations. Although it is within the scope of the present invention to employ different recording disks 20 for different purposes and under different circumstances.

The recording operation is initiated by placing a blank recording disk onto platen 24 with its recording face oriented toward the write head 44. The control unit 60 will then initiate synchronous rotation of both the control disk 20 and the recording disk 22 while the positioner 18 extends the carriage 16 so that the read head and write head 44 enter the space between the disks. The carriage 16 will be initially positioned so that read beam 42 can scan the start-of-disk codes, typically located in region 30a near the center of the control disk 20. Once the proper codes are located, recording on recording disk 22 will commence. Usually, start-of-disk codes derived from the control disk 20 will be transferred to and recorded on recording disk 22 so that the disk can later be replayed on conventional playback equipment. After such codes are transferred, the recording of the external information (e.g., music) in the central area 30c of the disk will begin. The carriage 16 will track the tracking information located in region 30c on the control disk 20 and will thus be able to encode the external information in a pattern which is determined by said tracking information. Usually, rotational speed information will also be encoded onto the recording disk 22, with the information being derived from the central region 30c on the control disk 20. Finally, after the carriage 16 and read head 40 have scanned the entire tracking region 30c of disk 20, they will reach the end-of-disk codes found in region 30b of the disk. These codes will enable the control unit 60 to stop the recording operation as well as to encode the necessary end-of-disk codes onto the recording disk 22. The recording disk 22 will then be available for playback on conventional equipment or, optionally, on the recording unit 10 itself.

Although the foregoing invention has been described in detail for purposes of clarity of understanding, it will be obvious that certain modifications may be practiced within the scope of the appended claims.

What is claimed is:

1. A system for recording information on a recording disk of the type which is responsive to light, said system comprising:
    a rotatable spindle;
    a control disk permanently mounted to the spindle, the control disk having tracking information on a read surface thereof;
    means for rotating the recording disk and the control disk synchronously on the spindle;
    a read head for optically scanning the control disk to obtain the tracking information;
    a write head mechanically coupled to the read head for optically recording information on the recording disk using a light beam; and
    means for positioning the write head in response to the tracking information to write a tracking pattern on a write surface of the recording disk, wherein said write surface has a start-of-disk pattern in a first radial position, an end-of-disk pattern in a second radial position and a recordable region therebetween, said second tracking pattern being written in said recordable region from the start-of-disk pattern to the end-of-disk pattern.

2. A system as in claim 1, wherein the write head includes means for focusing a light beam on the recording disk in order to write digital information thereon.

3. A system as in claim 1, wherein the means for rotating the disks synchronously includes a motor connected to said spindle for rotating said spindle.

4. A system as in claim 1, wherein the means for positioning the write head functions by locating the read head relative to indicia on the control disk, whereby the write head is positioned as a result of being mechanically coupled to the read head.

5. A system as in claim 1 wherein the recording disk is mounted on the spindle such that the write surface is in parallel opposition to the read surface of the control disk, wherein both the read head and the write head are disposed between the control disk and the recording disk.

6. A system as in claim 1 wherein the recording disk is mounted on the spindle such that the write surface faces in the same direction as the read surface of the control disk, wherein only one of the read head and the write head is disposed between the control disk and the recording disk.

7. A system as in claim 1 wherein the write head is further positioned in response to the tracking information to write said start-of-disk pattern and said end-of-disk pattern.

8. A system for recording on a recording disk of the type which is responsive to light, said system comprising:
    means for rotating the recording disk synchronously with a control disk about a common axis, the means for rotating including a common shaft and a motor for rotating the shaft, wherein the control disk is permanently mounted to the shaft and the recording disk detachably secured to the shaft such that a write surface of the recording disk is in a parallel opposition to a read surface of the control disk;
    a carriage mounted to reciprocate between the recording disk and the control disk in a direction substantially parallel to the disk surfaces;
    a read head mounted on the carriage and disposed to optically scan the read surface of the control disk to obtain tracking information;
    a write head mounted on the carriage and disposed to record information on the write surface of the recording disk; and
    means for positioning the carriage in response to the tracking information, whereby the write head is positioned to record a tracking pattern on the write surface of the recording disk in a preselected pattern, wherein said write surface has a start-of-disk pattern in a first radial position, and end-of-disk pattern in a second radial position and a recordable region therebetween, said second tracking pattern being written in said recordable region from the start-of-disk pattern to the end-of-disk pattern.

9. A system as in claim 8, wherein the write head includes means for focusing a light beam on the recording disk in order to write digital information thereon.

10. A system as in claim 8, wherein the means for positioning includes a servo motor for translating the carriage radially relative to the axis of rotation of the disks.

11. A system as in claim 10, wherein the means for positioning further includes a controller capable of detecting the location of indicia on the control disk through the read head and translating the carriage to a position corresponding to the indicia with the servo motor.

12. A system as in claim 10, further comprising a control disk having spirally-arranged tracking indicia on a read surface thereof, whereby information is recorded in a spiral pattern on the recording disk.

13. A system as in claim 12, wherein the control disk further includes start-of-disk codes and end-of-disk codes on its read surface.

14. A system as in claim 13, wherein the control disk further includes information selected from operational information and diagnostic information.

15. A system as in claim 8 wherein the write head is further positioned in response to the tracking information to write said start-of-disk pattern and said end-of-disk pattern.

16. A method for writing information on a recording disk, said method comprising:
    detachably mounting the recording disk to a spindle, the spindle having a control disk permanently mounted thereto, said control disk having tracking information on a read surface thereof;

synchronously rotating the recording disk and the control disk on the spindle;

scanning the control disk with a read head;

radially positioning the read head to follow the tracking information;

radially positioning a write head mechanically coupled to the read head in tandem with the read head; and writing a tracking pattern on a write surface of the recording disk using the write head, wherein said write surface has a start-of-disk pattern in a first radial position, an end-of-disk pattern in a second radial position and a recordable region therebetween, said second tracing pattern being written in said recordable region from the start-of-disk pattern to the end-of-disk pattern.

17. A method as in claim 16, wherein the rotational speed of the disks is controlled based on information obtained by scanning the control disk with the read head.

18. A method as in claim 16, wherein the tracking pattern is arranged in a spiral.

19. A method as in claim 16, wherein the control disk is scanned with a laser beam in order to detect the tracking pattern.

20. A method as in claim 16, wherein the recording disk is responsive to light and the write head comprises a laser beam focusing assembly for recording digital information thereon.

21. A method as in claim 16, wherein additional information for user assistance is obtained by scanning the control disk with the read head.

22. A method as in claim 16 further comprising writing said start-of-disk pattern and said end-of-disk pattern using the write head.

* * * * *